(12) United States Patent
Wang

(10) Patent No.: US 8,134,794 B1
(45) Date of Patent: Mar. 13, 2012

(54) METHOD AND SYSTEM FOR PROVIDING AN ENERGY ASSISTED MAGNETIC RECORDING HEAD IN A WAFER PACKAGING CONFIGURATION

(75) Inventor: Lei Wang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 117 days.

(21) Appl. No.: 12/645,498

(22) Filed: Dec. 23, 2009

(51) Int. Cl.
*G11B 5/02* (2006.01)
(52) U.S. Cl. ....... 360/59; 360/110; 720/659; 369/13.33; 369/13.13
(58) Field of Classification Search .................. None
See application file for complete search history.

(56) References Cited

U.S. PATENT DOCUMENTS

| | | | |
|---|---|---|---|
| 5,140,569 A | 8/1992 | Nebashi | |
| 6,181,673 B1 | 1/2001 | Wilde | |
| 6,404,706 B1 * | 6/2002 | Stovall et al. | 369/13.17 |
| 6,859,346 B1 | 2/2005 | Meyer | |
| 7,042,810 B2 * | 5/2006 | Akiyama et al. | 369/13.33 |
| 7,158,470 B2 * | 1/2007 | Thornton et al. | 369/121 |
| 7,203,387 B2 | 4/2007 | Doan | |
| 7,327,667 B2 | 2/2008 | Thornton | |
| 7,336,443 B2 * | 2/2008 | Bonin | 360/234.7 |
| 7,349,614 B2 * | 3/2008 | Doan | 385/131 |
| 7,372,648 B2 | 5/2008 | Akiyama | |
| 7,885,029 B2 * | 2/2011 | Miyauchi et al. | 360/59 |
| 8,012,804 B1 * | 9/2011 | Wang et al. | 438/110 |
| 8,024,748 B1 * | 9/2011 | Moravec et al. | 720/659 |
| 2007/0165495 A1 | 7/2007 | Lee | |
| 2008/0002298 A1 | 1/2008 | Sluzewski | |
| 2008/0239541 A1 * | 10/2008 | Shimazawa et al. | 360/59 |
| 2008/0239580 A1 * | 10/2008 | Harada et al. | 360/250 |
| 2010/0328807 A1 * | 12/2010 | Snyder et al. | 360/59 |
| 2011/0026156 A1 * | 2/2011 | Shimazawa et al. | 360/59 |
| 2011/0096435 A1 * | 4/2011 | Sasaki et al. | 360/114.01 |

* cited by examiner

*Primary Examiner* — Dismery Mercedes

(57) ABSTRACT

A method and system for providing energy assisted magnetic recording (EAMR) heads are described. The heads include sliders having leading and trailing edges. An EAMR transducer for each head is fabricated on a front face of a substrate that corresponds to the trailing edge of the slider. An overcoat layer that includes transducer and laser contact(s) is provided on the transducer. A laser for providing light to the transducer is provided on each slider. The laser is electrically coupled to the laser contact(s) and electrically insulated from at least part of the transducer contacts. The laser is enclosed in a capping layer, which has a laser-facing surface including a laser cavity, via(s), a trailing surface, and pads on the trailing surface. The laser cavity encloses the laser between the overcoat and capping layers. The via(s) provide electrical connection to the transducer contacts. The substrate is separated into the heads.

23 Claims, 13 Drawing Sheets

Trailing Edge View

Side View

Exploded View

Perspective View

Trailing Edge View

Side View

Side View

Trailing Edge View

Side View

METHOD AND SYSTEM FOR PROVIDING AN ENERGY ASSISTED MAGNETIC RECORDING HEAD IN A WAFER PACKAGING CONFIGURATION

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Although termed "edges", the leading edge 22 and trailing edge 26 are surfaces of the slider 20. The leading edge 22 and trailing edge 26 are so termed because of the direction the conventional media 12 travels with respect to the EAMR transducer 28. Other components that may be part of the conventional EAMR disk drive 10 are not shown. The conventional slider 20 is typically attached to the suspension at its back side 24. A conventional EAMR transducer 22 is coupled with the slider 20.

The laser diode 30 is coupled in proximity to the EAMR transducer 22 on the trailing edge 26 of the slider 20. Light from the conventional laser diode 30 is provided substantially along the optic axis 32 of the conventional laser diode 30 to the trailing edge 26 of the slider 20. More specifically, light from the laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional media 12. The conventional EAMR transducer 22 magnetically writes to the conventional media 12 in the region the conventional media 12 is heated.

FIG. 2 depicts a conventional method 50 for fabricating a portion of the conventional EAMR disk drive 10. For simplicity, only a portion of the method 50 is described. The EA conventional MR transducer 28 is fabricated on the front side of a conventional substrate, such as an AlTiC substrate, via step 52. Typically, a reader for the conventional disk drive 10 has already been fabricated. Thus, the conventional EAMR transducer 28 is built on other structures. Typically, multiple transducers are fabricated in parallel on the same substrate.

Once fabrication of the conventional EAMR transducer 28 is completed, the laser diode 30 may be mounted in proximity to the conventional EAMR transducer 28, via step 54. More specifically, the laser diode 30 is mounted in proximity to the trailing surface 26 of the slider 20. The EAMR heads may then be separated, via step 56. For example, the substrate holding the EAMR transducers 28 may be cleaved or otherwise cut into individual sliders 20. The front side of the substrate, on which the EAMR transducer 28 is fabricated, becomes the trailing edge 26 of the slider 20. In other embodiments, the EAMR heads are separated prior to the laser diode 30 being mounted. However, in both cases, the laser diode is mounted in proximity to the EAMR transducer 26 and, therefore, in proximity to the trailing edge 26. The fabrication of the conventional drive 10 may then be completed. For example, the conventional EAMR head including the conventional slider 20 and conventional EAMR transducer 28 may be mounted on a flexure and then in a disk drive.

Although the conventional EAMR disk drive 10 and method 50 may function, improvements are desired. More specifically, coupling the laser 30 to the trailing edge 26 of the slider 20 is problematic. The laser 30 would occupy a larger portion of the trailing edge 26. This space is normally reserved for items such as contacts to the transducer 28. Although smaller lasers 30 might be used, such lasers are typically less reliable. Consequently, reducing the size of the laser 30 may adversely affect reliability of the conventional EAMR disk drive 10.

Accordingly, what is needed are improved methods and systems for fabricating EAMR disk drives, including coupling the laser with the EAMR transducer and assembling the slider, the laser, and the flexure (not shown) are desired.

BRIEF SUMMARY OF THE INVENTION

A method and system for providing energy assisted magnetic recording (EAMR) heads are described. The heads includes sliders, each of which has a leading edge and a trailing edge. The method and system include fabricating an EAMR transducer for each of the EAMR heads on a substrate having a front face corresponding to the trailing edge of each of the sliders. The EAMR transducer is fabricated on the front face and resides at the trailing edge of the slider. The method and system also include providing an overcoat layer on the EAMR transducer. The overcoat layer includes transducer contacts and laser contact(s). The EAMR transducer is between the overcoat layer and the trailing edge. The method and system also include providing a laser for the EAMR transducer on each of the sliders. The laser provides light to the EAMR transducer. The laser is electrically coupled to the laser contact(s) and electrically insulated from at least a portion of the transducer contacts. The method and system also include enclosing the laser in a capping layer for each of the EMAR heads. The capping layer has a laser-facing surface including a laser cavity therein, at least one via, a trailing surface, and a plurality of EAMR pads on the trailing surface. The laser cavity encloses the laser between the overcoat layer and the capping layer. The via(s) are for providing electrical connection to the transducer contacts. The method and system further include separating the substrate into the plurality of EAMR heads.

DETAILED DESCRIPTION OF EMBODIMENTS OF THE INVENTION

Figure 1:
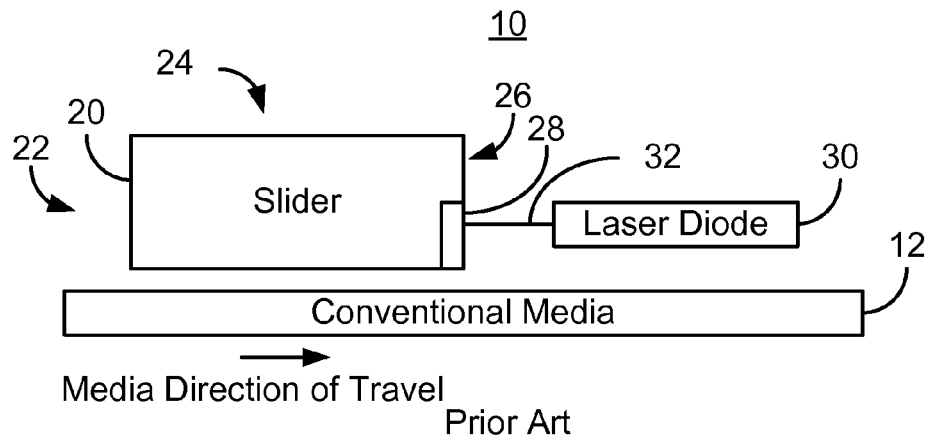
FIG. 1 is a diagram depicting a portion of a conventional energy assisted magnetic recording disk drive.
Figure 2:
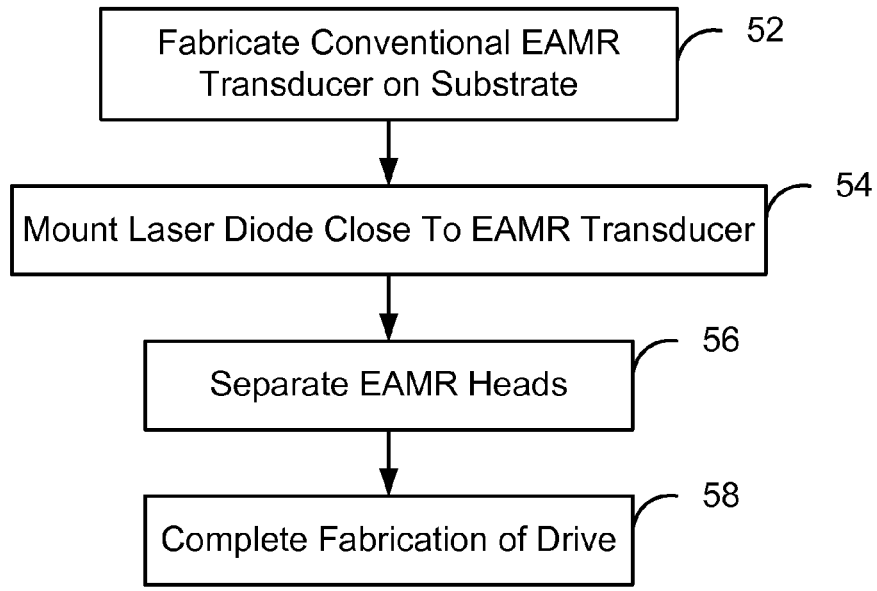
FIG. 2 is a flow chart depicting a conventional method for fabricating a conventional EAMR disk drive.
Figure 3:
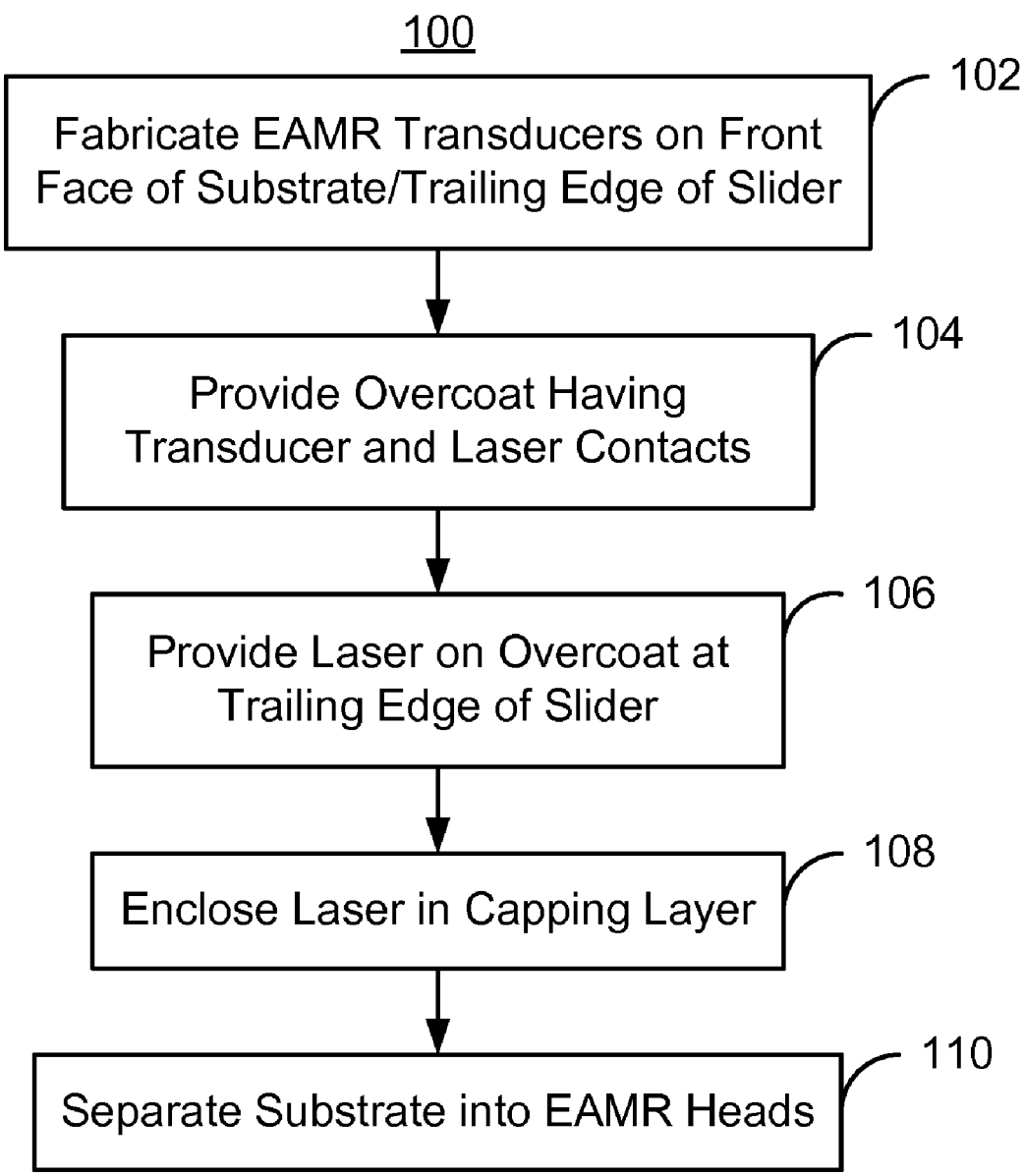
FIG. 3 is a flow chart depicting an exemplary embodiment of a method for fabricating an EAMR head.

FIG. 3 is a flow chart depicting an exemplary embodiment of a method 100 for fabricating EAMR heads. Although certain steps are shown, some steps may be omitted, interleaved, performed in another order, and/or combined. The EAMR heads being fabricated may be part of merged heads, each of which includes an EAMR write transducer, a read transducer (not shown) and resides on a slider. Further, each EAMR head includes a slider having a leading edge and a trailing edge.

Although termed "edges", the leading edge corresponds to a leading surface, while the trailing edge corresponds to a trailing surface.

An EAMR transducer is fabricated for each of the EAMR heads, via step 102. The EAMR transducers are fabricated on the front face of a substrate. This front face corresponds to the trailing edge of the slider. Step 102 may include fabricating optics, such as gratings, waveguides, and near-field transducers (NFTs), as well as magnetic components such as poles, shields, and coils.

An overcoat layer is provided on the EAMR transducer, via step 104. The overcoat layer includes transducer contacts and at least one laser contact for providing electrical connection to the EAMR transducer and laser, respectively. The EAMR transducer resides between the overcoat layer and the trailing edge of the slider on which the EAMR transducer is provided.

A laser is provided for each EAMR transducer on each of the sliders, via step 106. Step 106 includes aligning and placing the laser, as well as electrically and mechanically coupling the laser. The laser is electrically coupled to the laser contact(s) and electrically insulated from at least a portion of the transducer contacts.

The laser for each of the EMAR heads is enclosed in a capping layer, via step 108. The capping layer has a laser-facing surface that is in proximity to the laser and a trailing surface opposite to the laser-facing surface. The laser-facing surface includes a laser cavity therein. The capping layer also includes at least one via and EAMR pads on the trailing surface. The laser cavity is configured such that the laser fits within the cavity. Thus, the laser cavity encloses the laser between the overcoat layer and the capping layer. The via(s) are for providing electrical connection to the transducer contacts.

The substrate is separated into the EAMR heads, via step 110. Step 110 may include dicing the substrate such that the components fabricated in step 102 through 108 remain with the corresponding EAMR head.

Figure 4:
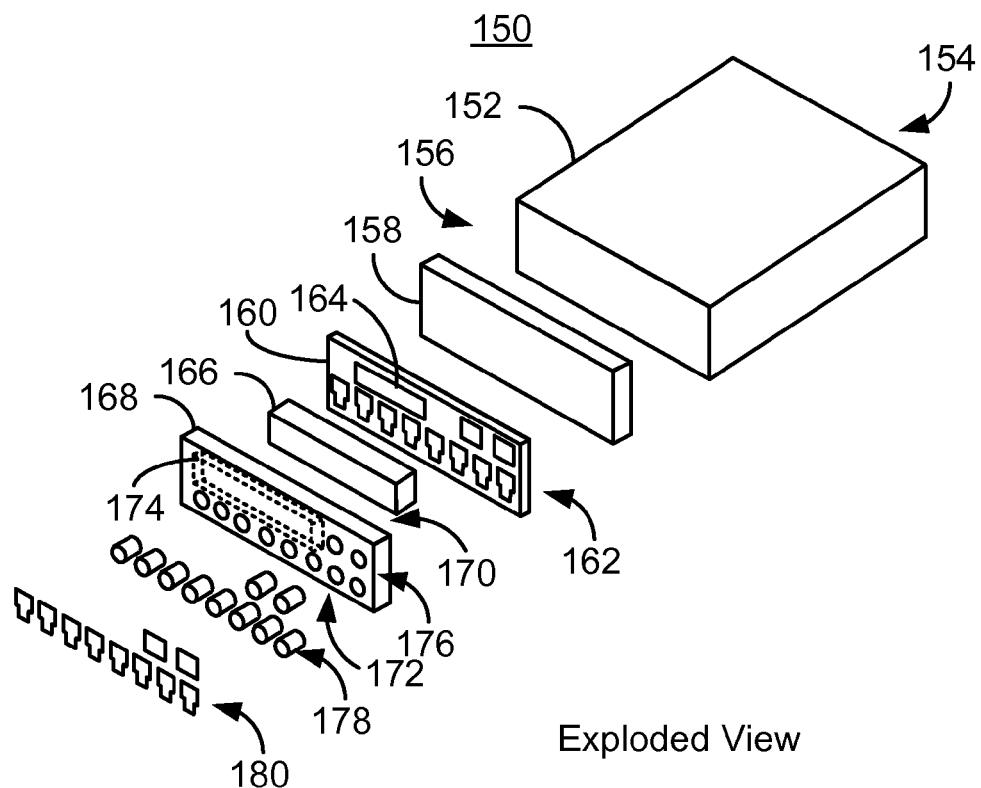
FIG. 4 is a diagram depicting an exemplary embodiment of an EAMR head.
Figure 4:
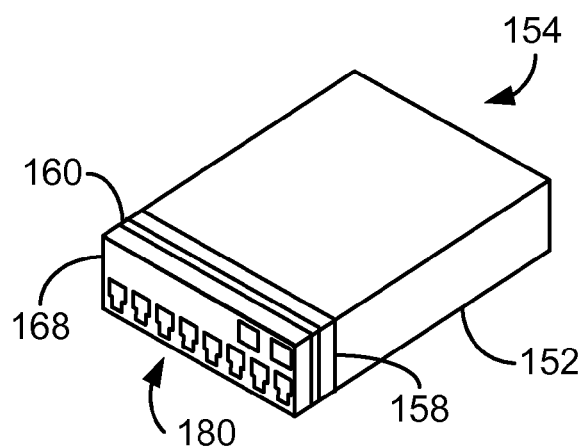

FIG. 4 is a diagram depicting an exemplary embodiment of an EAMR head 150 fabricated using the method 100. Both perspective and exploded views are shown in FIG. 4. For clarity, FIG. 4 is not to scale. The EAMR head 150 includes a slider 152 which is part of the substrate (not shown). The slider 152 includes a leading edge 154 and a trailing edge 156. One or more EAMR transducers reside on the trailing edge 156 of the slider 152. In the embodiment shown in FIG. 4, a single EAMR transducer 158 is shown. In some embodiments, a reader may be considered part of the transducer 158. Thus, the module 158 may be considered to include both a reader and a writer. An overcoat 160 resides on the EAMR transducer 158. The overcoat is shown with laser contact 164 and transducer contacts 162. However, in another embodiment, another number of laser contacts 164 and/or another number of transducer contacts 162 may be provided. Laser 166 is also shown. In some embodiments, the laser 166 is a surface-emitting laser. The laser 166 is connected with laser contact 164, but insulated from the transducer contacts 162. Capping layer 168 is also provided. The capping layer 168 includes a laser-facing surface 170 and a trailing surface 172. The laser facing surface 170 includes cavity 174 shown by dotted lines in FIG. 4. The cavity 174 encloses the laser 166. Thus, the laser 166 resides between the overcoat 160 and the capping layer 168. Consequently, the laser 166 is not visible in the perspective view. Also shown as part of the capping layer 168 are via holes 172 into which vias 178 fit. The vias 178 are thus conductive. Also shown are pads 180 used to make electrical contact to the head 150. Thus, electrical connection between the pads 180 and transducer contacts 162 is provided by the vias 178.

In operation, the laser 166 emits light that is transmitted to the EAMR transducer 158. The light is used to heat a media (not shown) to which the EAMR transducer 158 magnetically records data.

Using the method 100, the EAMR head 150 may be fabricated. The laser 166 may be affixed to the trailing edge 156 of the slider 152. Because the laser 166 is placed above the overcoat 160 and electrically insulated from the transducer contacts 162, a larger laser 166 having a higher power and improved reliability may be used. Stated differently, real estate management on the trailing edge 156 may be improved. Further, space may remain on the trailing surface 172 of the capping layer 168. Thus, a device identification may also be provided on the trailing edge of the EAMR head 150. A flat surface for bonding to the pads 180, as well as larger pads, may also be provided. Thus, providing electrical connection to the EAMR head may be simplified and improve yield. Moreover, the form factor of the EAMR head 150 is similar to a conventional EAMR head which may not have the enhanced performance and reliability of the EAMR transducer 150.

Figure 5:
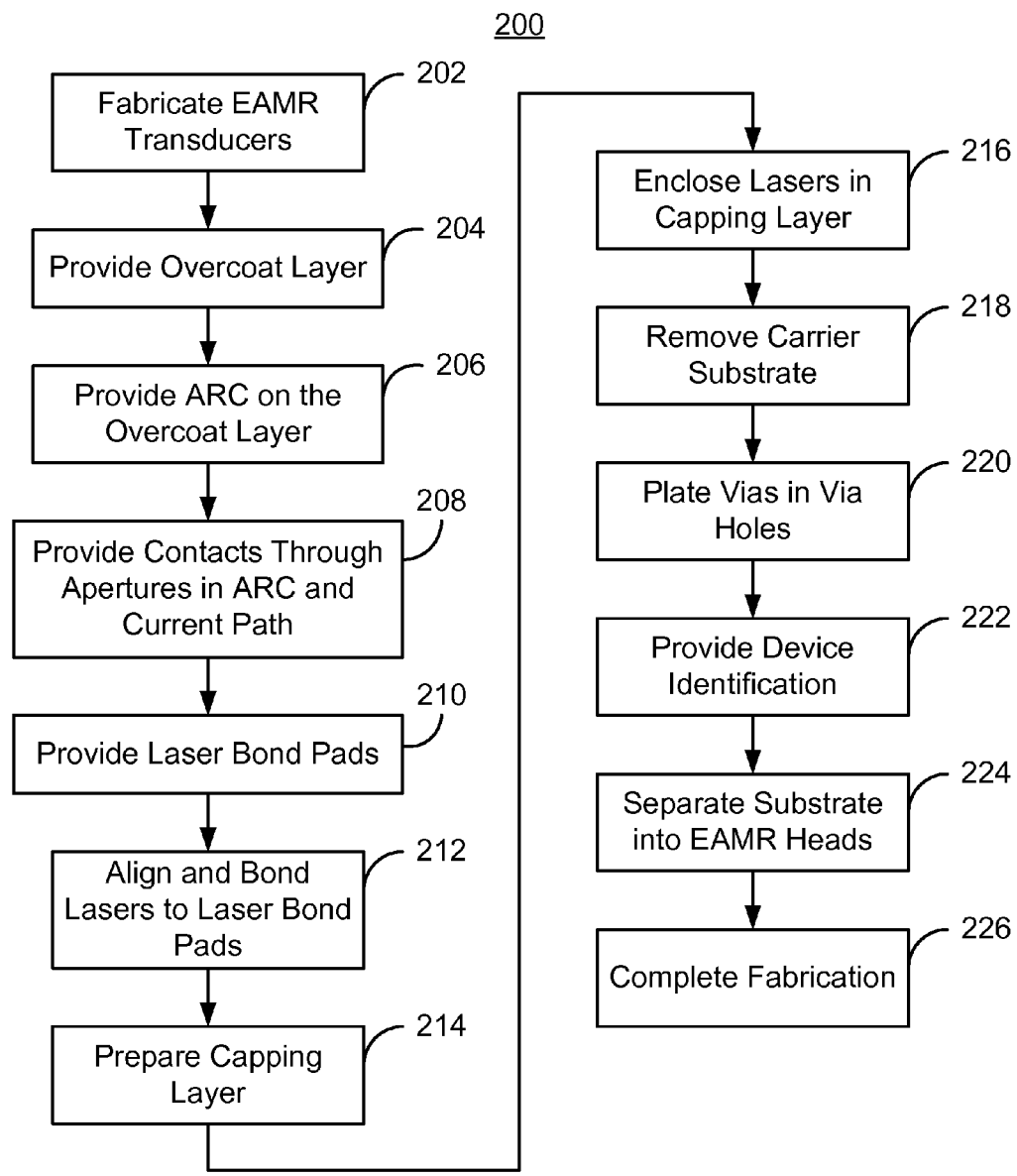
FIG. 5 is a flow chart depicting another exemplary embodiment of a method for fabricating an EAMR head.

FIG. 5 is a flow chart depicting another exemplary embodiment of a method 200 for fabricating an EAMR head. FIGS. 6-14 are diagrams depicting side and trailing edge views of an EAMR head 250 during fabrication. For clarity, FIGS. 6-14 are not to scale. Further, for simplicity, not all components are labeled in FIGS. 6-14. Referring to FIGS. 5-14, the method 200 is described in the context of the substrate, EAMR transducer, and other components shown. However, the method 200 may be used to form another device (not shown). The EAMR head 250 being fabricated may be part of a merged head that also includes a read head (not shown in FIGS. 6-14) and resides on a slider of a disk drive. The slider has a leading edge and a trailing edge. The trailing edge generally corresponds to the front face of the substrate on which the EAMR head 250 is fabricated. The leading edge generally corresponds to the back face of the substrate. Although the method 200 is described in the context of a single EAMR head depicted in FIGS. 6-14, multiple heads are typically fabricated in parallel.

Figure 6:
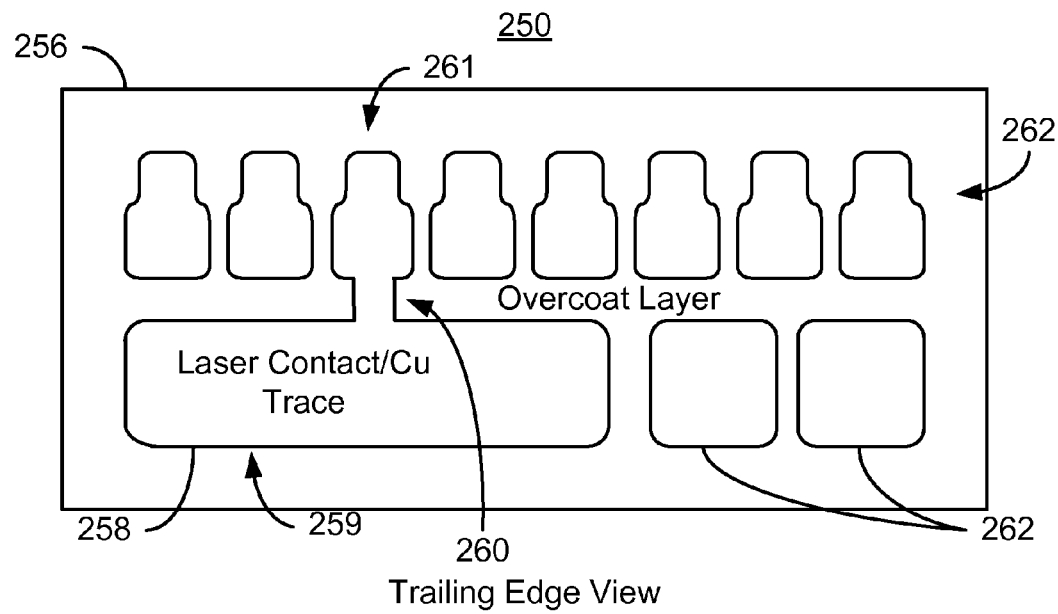
FIGS. 6-14 are diagrams depicting an exemplary embodiment of an EAMR head during fabrication.
Figure 6:
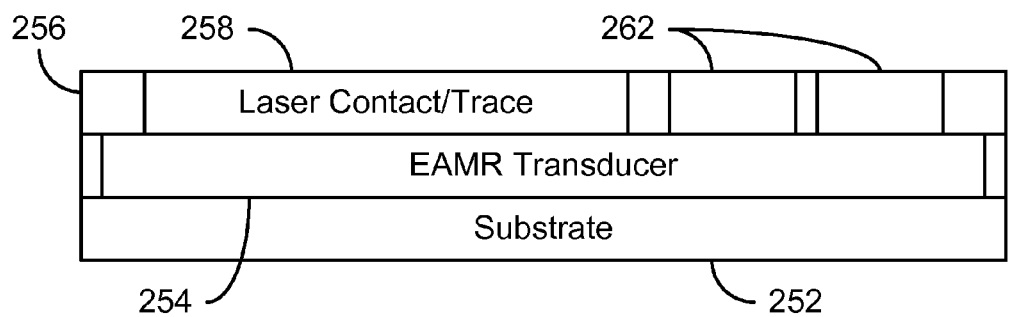

EAMR transducers for the EAMR heads 250 are fabricated on the front face of the substrate, via step 202. Step 202 is analogous to step 102. An overcoat layer is provided on the EAMR transducer, via step 204. FIG. 6 depicts the EAMR head 250 after step 204 is performed. Thus, the EAMR transducer 254 has been formed on the substrate 252. Typically, a reader (not explicitly shown) is also formed below the EAMR transducer 254. The overcoat 256 is also shown. The overcoat layer 256 is insulating, but includes laser contact 258 and transducer contacts 262. The laser contact 258 includes a trace 259, a lead 260, and a contact pad 261. The laser contact 258 may also serve as a heat sink for the laser (not shown in FIG. 6). Alternatively, a separate heat sink may be provided. Further, the contacts 262 may be made smaller as electrical connection will be made through vias provided using photolithography, rather than wirebonding or similar processes. The EAMR transducer 254 resides between the overcoat layer 256 and the trailing edge of the slider 254.

Figure 7:
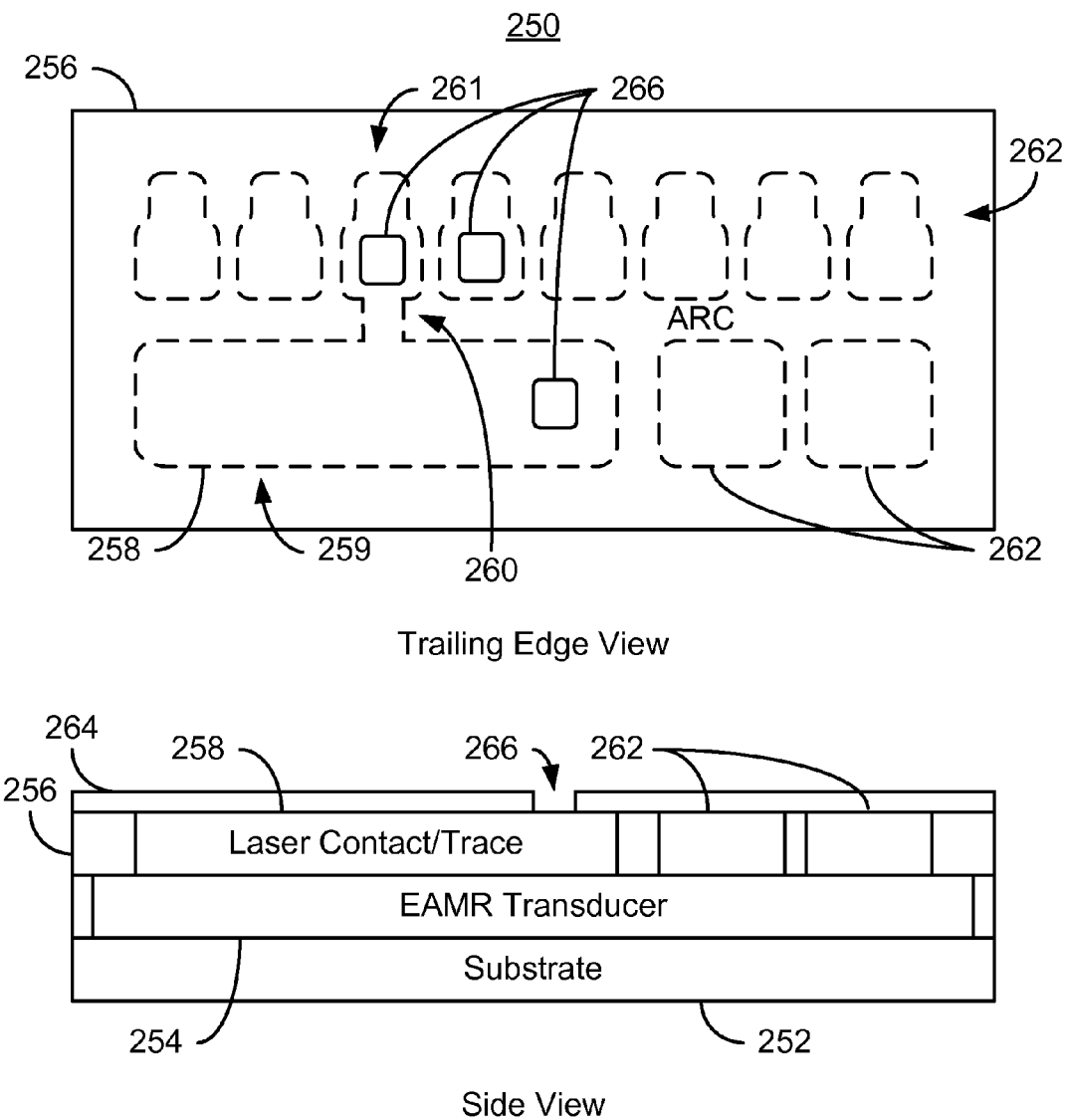

An antireflective coating (ARC) is provided on the overcoat layer, via step 206. FIG. 7 depicts the EAMR head 250 after step 206 is performed. Thus, the ARC 264 is shown. The transducer contacts 262 and laser contact 258 on the overcoat layer 256, below the ARC 264, are shown by dotted lines in the trailing edge view. The ARC 264 serves as an ARC, facilitating light coupling from the laser to the EAMR transducer 254. In addition, the ARC 264 is electrically insulating. Thus, the ARC electrically insulates the laser (not shown in FIG. 7) from the transducer contacts 262. In addition, the ARC 264 includes apertures 266 therein. The apertures 266 are essentially via holes, to allow the lasers to be electrically coupled to the laser contact 258.

Figure 8:
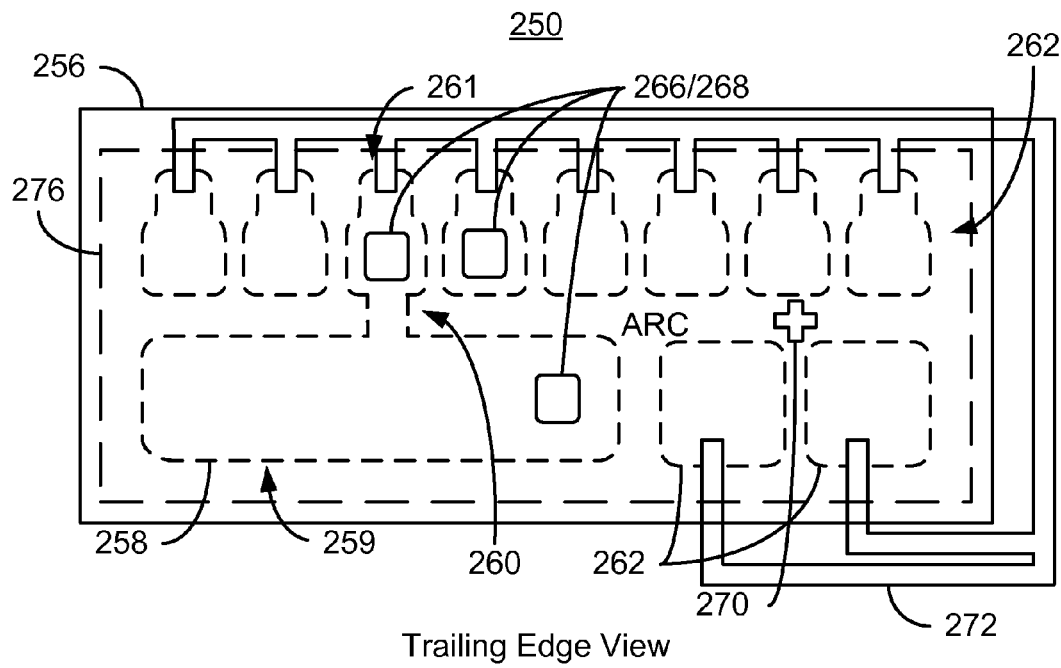
Figure 8:
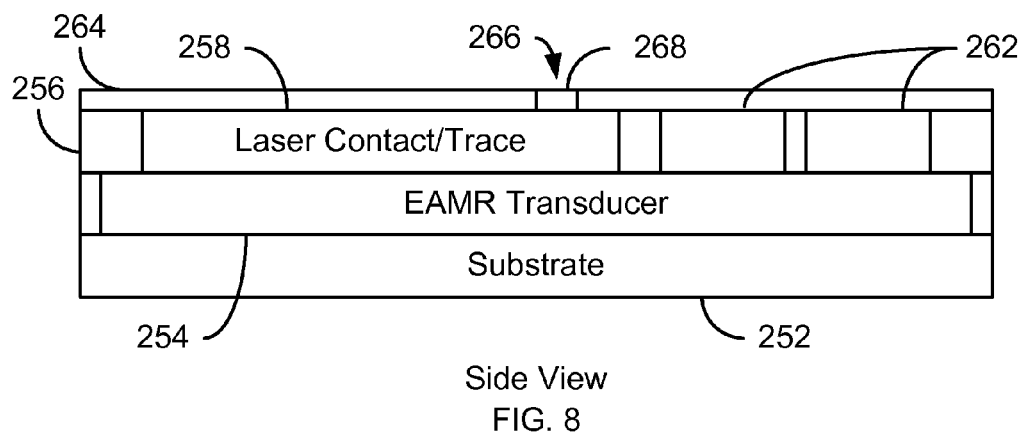

Contacts are provided through the apertures 266, via step 208. Step 208 may include plating a conductor, such as Cu. FIG. 8 depicts the EAMR head 250 after step 208 has been performed. Thus, contacts 268 have been plated. Also in step 208, an alignment mark 270 and a current path 272 are provided. The contacts 268, alignment mark 270, and current path 272 may be formed by masking the EAMR head 250 and plating a noble metal, such as Au. In the embodiment shown, the electrical current path 272 connects the transducer contacts 262 as well as the laser contact 258. However, in another embodiment, the electrical current path 272 may not connect one or more of the contacts 258 and 262. As can be seen in FIG. 8, the current path 272 does not overlap the alignment mark 270. The alignment mark 270 may be used in bonding the laser (not shown in FIG. 8) to the EAMR head 250. Further, much of the current path 272 lies outside of the edges 276 of the EAMR head 250. Because substrate 252 has not been separated into individual the EAMR heads 250, the edges 276 are shown by dashed lines. Thus, the current path 272 lies on a portion of the device that will be removed prior to completing fabrication of the EAMR head 250. Although the electrical current path 272 electrically connects the transducer contacts 262 during fabrication, this connection is broken once fabrication is completed. The current path 272 may thus provide a current path for plating and other processes during fabrication without adversely affecting performance of the EAMR head 250.

Laser bond pads are provided on the ARC 264 and electrically connected with the contacts 268, via step 210. In some embodiments, formation of the bond pads includes forming a mask, depositing the conductor for the bond pads, and performing lift-off of the mask. In another embodiment, the bond pads may be plated in step 210. In such an embodiment, a seed layer such as Ti and/or Cu may be deposited first, then the resist provided and patterned. The laser bond pads materials, such as Cu and Au or In, may then be plated. After the plating is complete, the resist may be stripped and any remaining seed removed, for example with a wet etch. If a wet etch is used, any alignment marks made using a noble metal remain. As a result, the alignment marks may still assist in aligning the laser, as described below.

Figure 9:
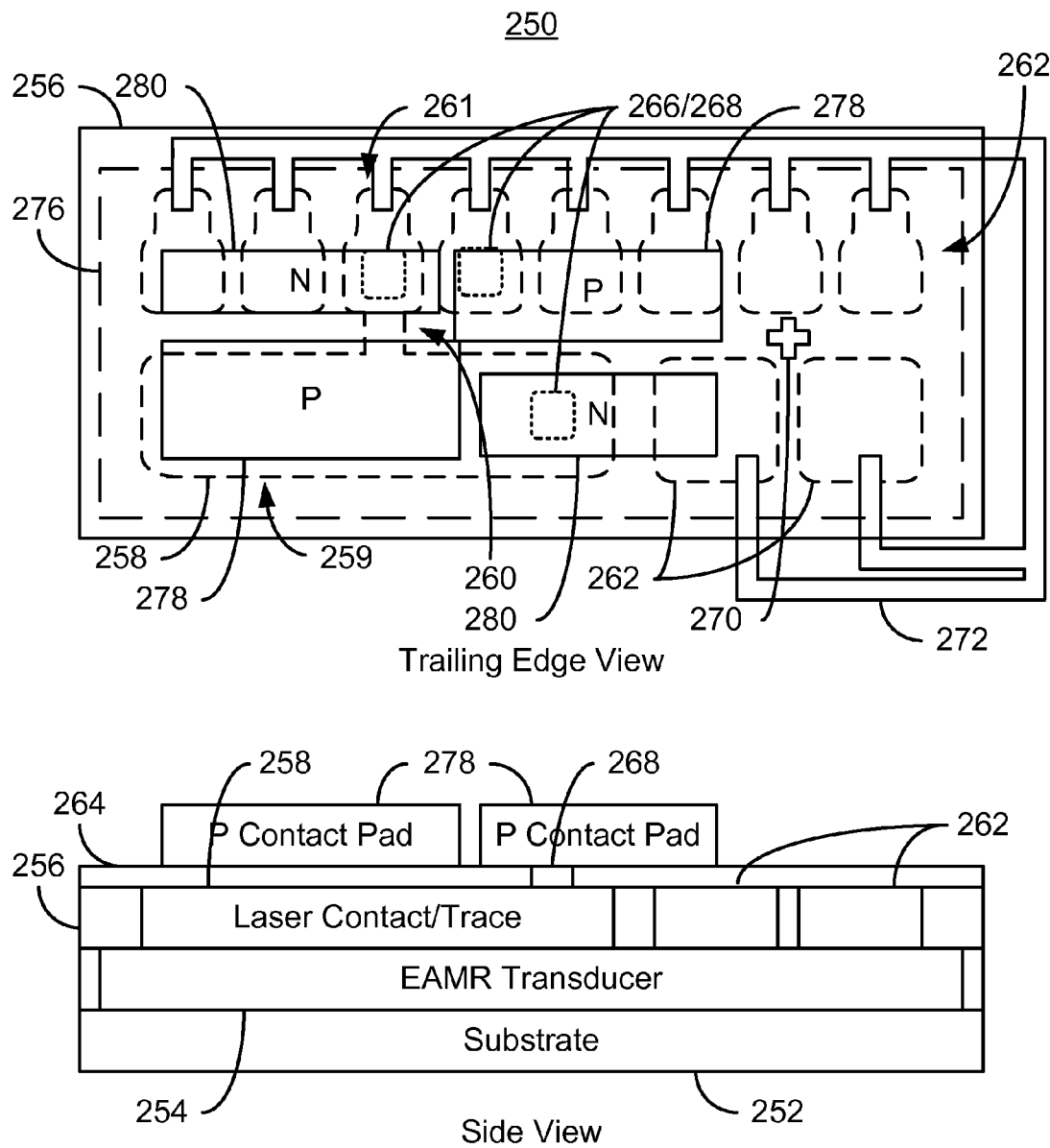

FIG. 9 depicts the EAMR head 250 after step 210 is performed. Thus, laser bond pads 278 and 280 are shown. Because contacts 268 are covered by bond pads 278 and 270, contacts 268/apertures 266 are shown by dotted lines in FIG. 9. Four laser bond pads 278 and 280 are shown: two bond pads 278 for the N-contact and two bond pads 280 for the P-contact. However, in another embodiment, another number of bond pads may be used. The use of four somewhat symmetric bond pads may aid in symmetrical carrier injection for lasing. However, in other embodiments, other configurations are possible.

Figure 10:
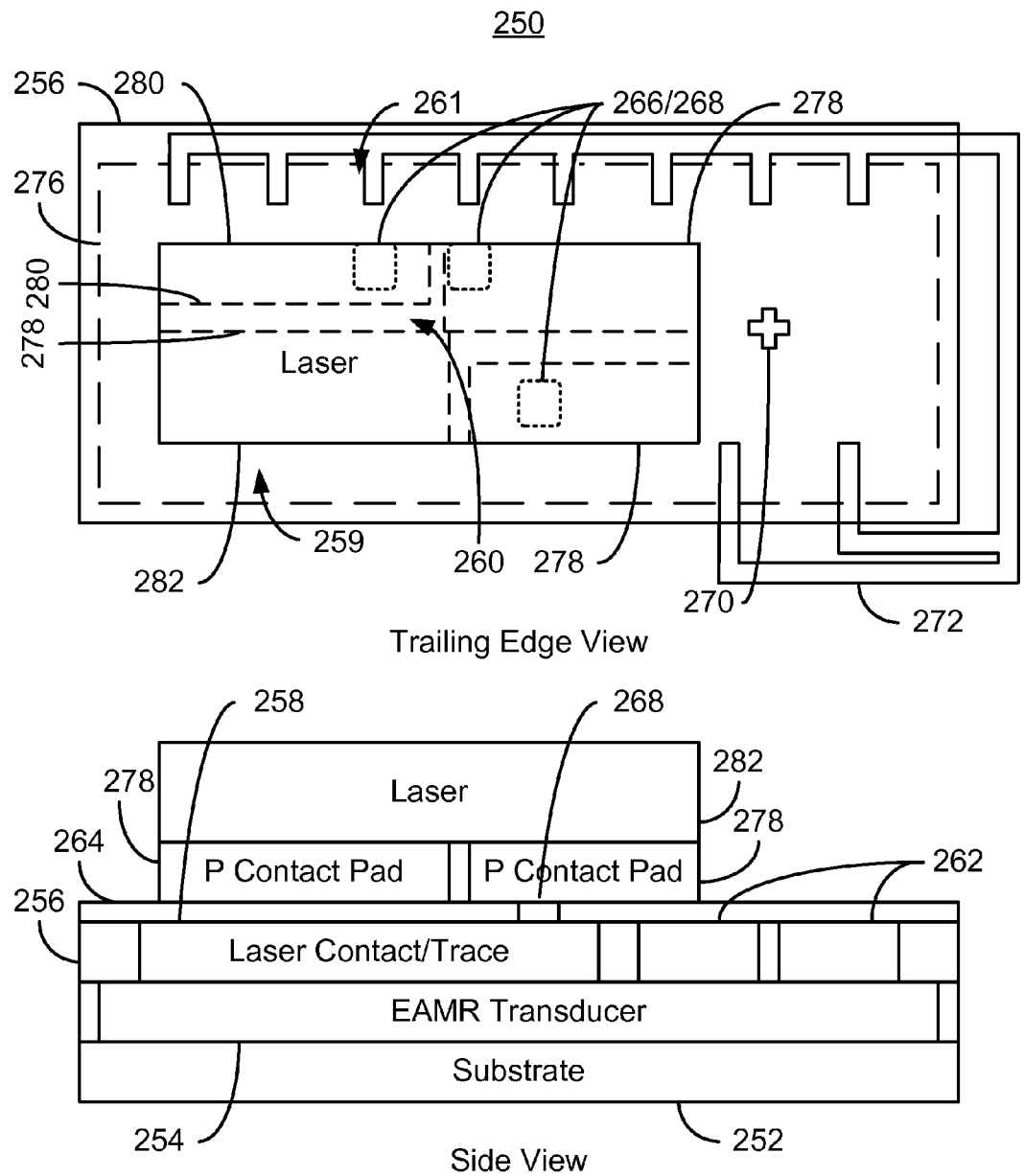

The laser, generally a laser diode, is aligned and bonded to the laser bond pads 278 and 280, via step 212. Step 212 may include aligning the laser to alignment mark 270. The laser may then be mechanically bonded to the laser bond pads 278 and 280 by processes such as soldering or thermal compression. In some embodiments, multiple lasers, for example on a bar of laser diodes may be aligned simultaneously. Alternatively, lasers may be individually aligned and bonded. FIG. 10 depicts the EAMR head 250 after step 212 has been completed. Thus, the laser 282 is electrically and mechanically coupled to the bond pads 278 and 280. For clarity, the transducer contacts 262 and laser contacts 258 are omitted from the trailing edge view of FIG. 10. Further, the laser 282 is shown as extending to the edges of the laser bond pads 278 and 280. However, in other embodiments, the laser 282 may extend beyond or not to the edges of the pond pads 278 and 280.

Figure 11:
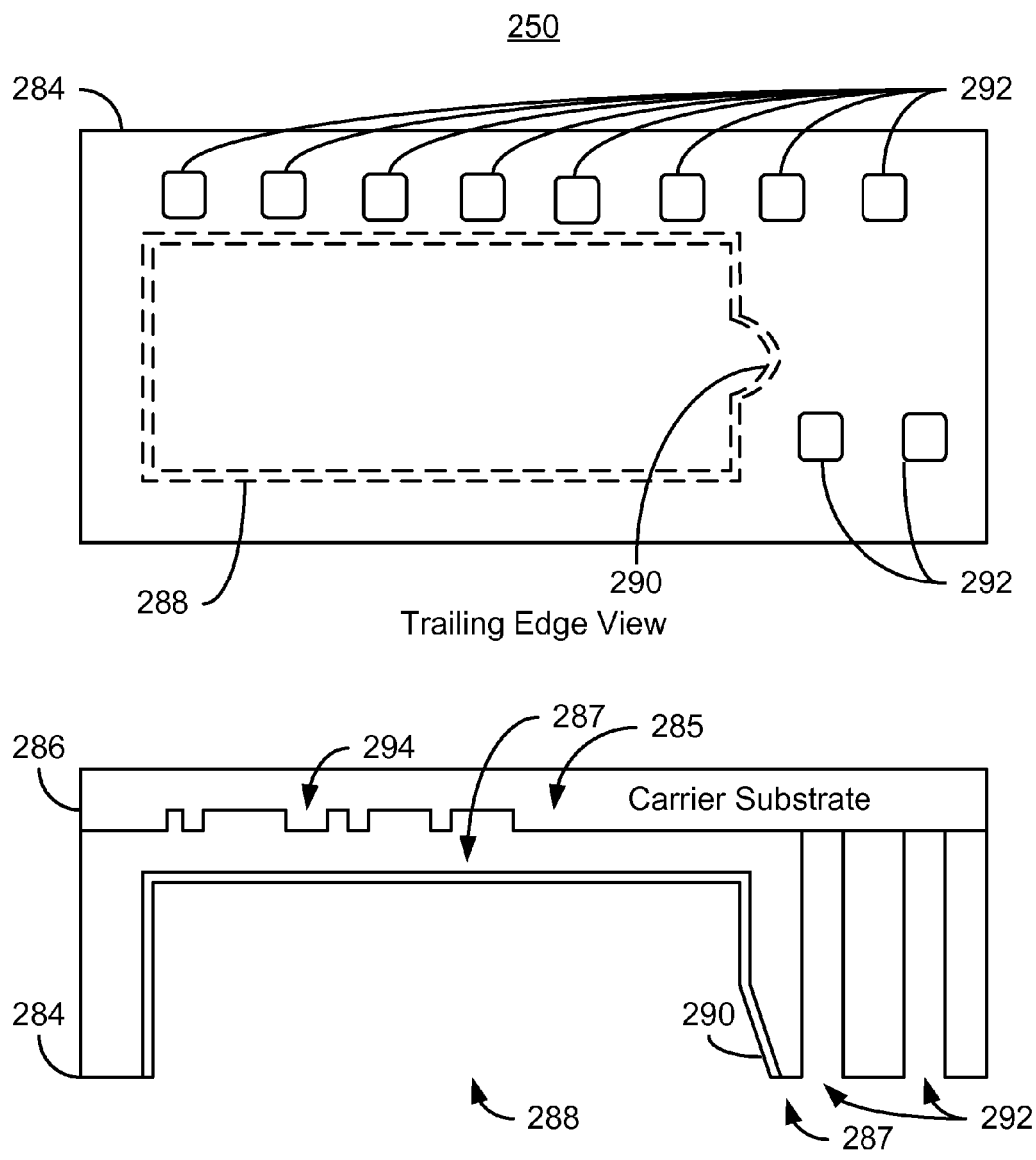

A capping layer may then be prepared, via step 214. Step 214 may include molding the capping layer to include a laser cavity and various via holes. In some embodiments, step 214 also includes forming mirrors within the laser cavity. For example, a reflective coating, such as an Au coating may be deposited in the laser cavity. In some embodiments, therefore, step 214 includes depositing a capping layer on a carrier substrate that may be composed of silicon or glass. Cavities and via holes may then be etched or molded into the capping layer. A deposition tool is aligned to the laser cavity and a reflective surface deposited. In some embodiments, a device identification 294 may also be etched into the carrier substrate. Once the carrier substrate is removed, the device identification appears on the EAMR head 250. FIG. 11 depicts the capping layer 284 after step 214 is performed but before the capping layer 284 is affixed to the EAMR head. Also shown is a carrier substrate 286. The capping layer 284 includes a laser facing surface 287 and the trailing surface 285. The trailing surface 285 faces the carrier substrate 286. A laser cavity 288 and via holes 292 have been molded or otherwise formed in the capping layer 284. In addition, a mirror 290 has been formed by depositing a reflective surface within the laser cavity 288. Because the trailing edge view is shown in FIG. 11, the laser cavity 288 and mirror 290 are shown as dashed lines.

Figure 12:
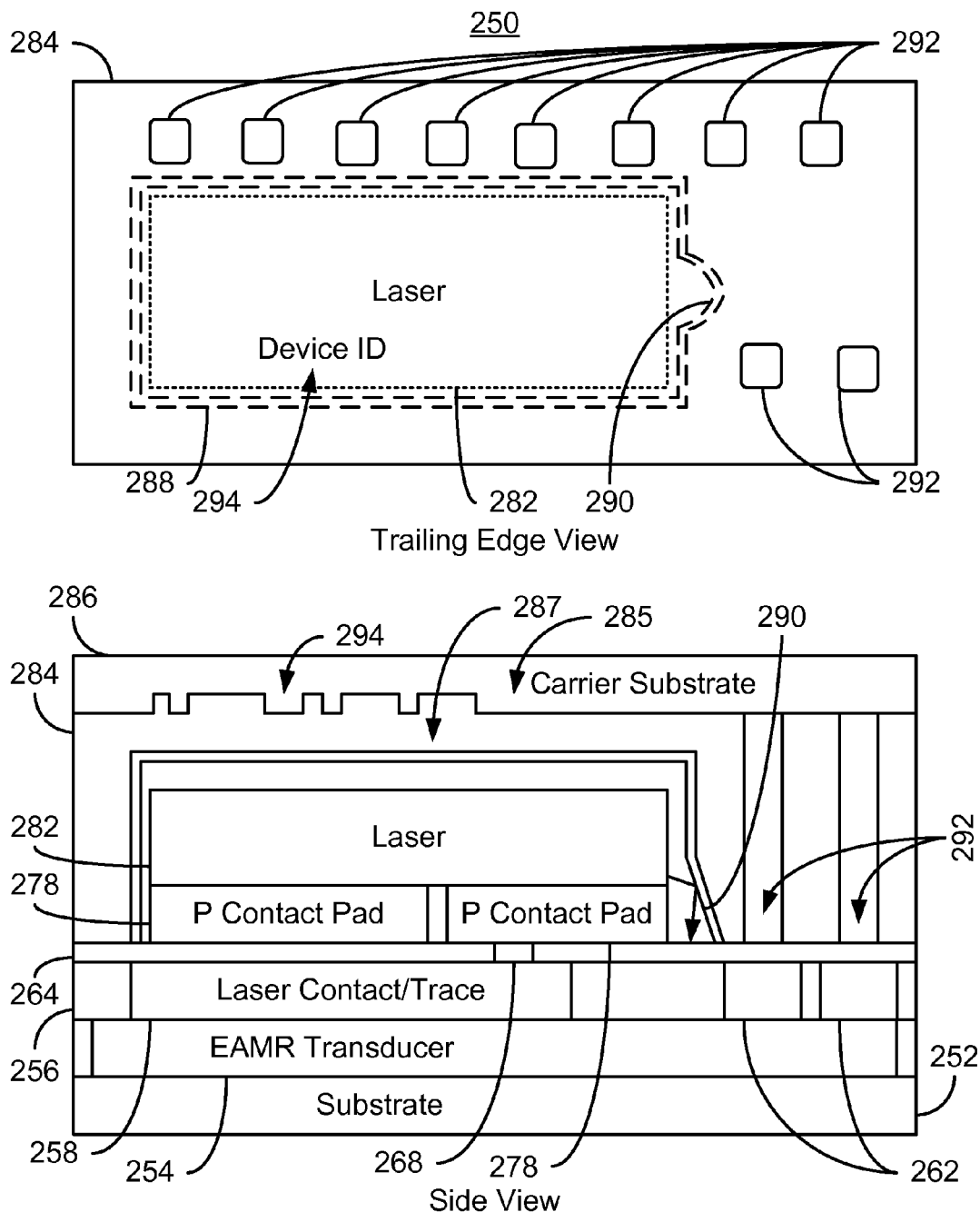

The laser 282 is enclosed in the capping layer 284, via step 216. Step 216 includes bonding the capping layer 284 to the AlTiC substrate 252 on which the EAMR transducer 254 is formed. FIG. 12 depicts the EAMR head 250 as the capping layer 284 is being placed. As can be seen in FIG. 12, the laser cavity 288 is aligned to and configured to fit the laser 282. Via holes 292 are aligned with transducer contacts 262. Also note that some components are not labeled in FIG. 12 for clarity.

Figure 13:
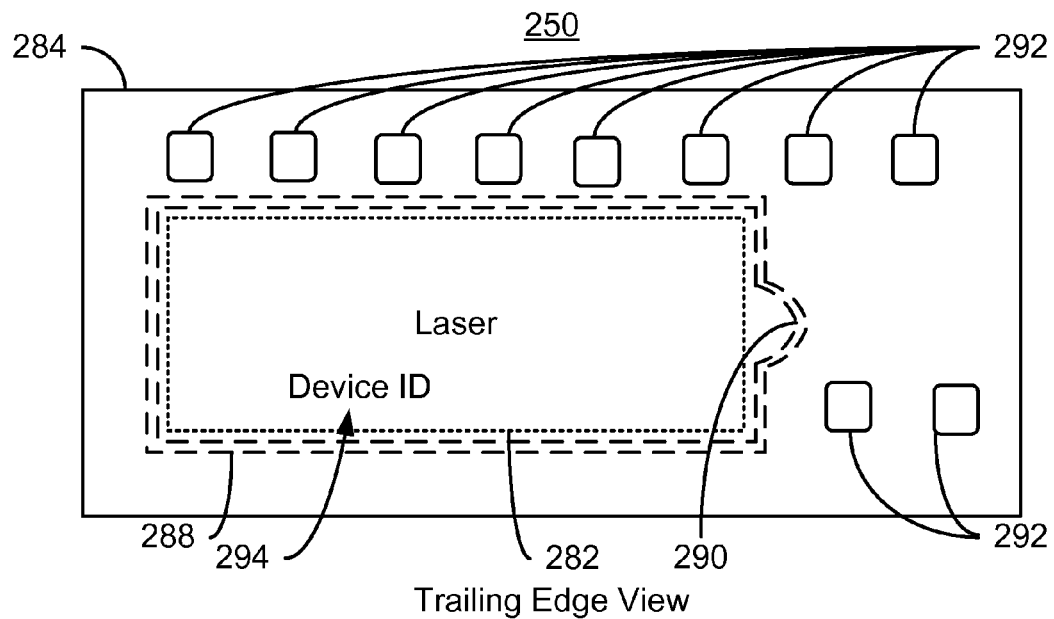
Figure 13:
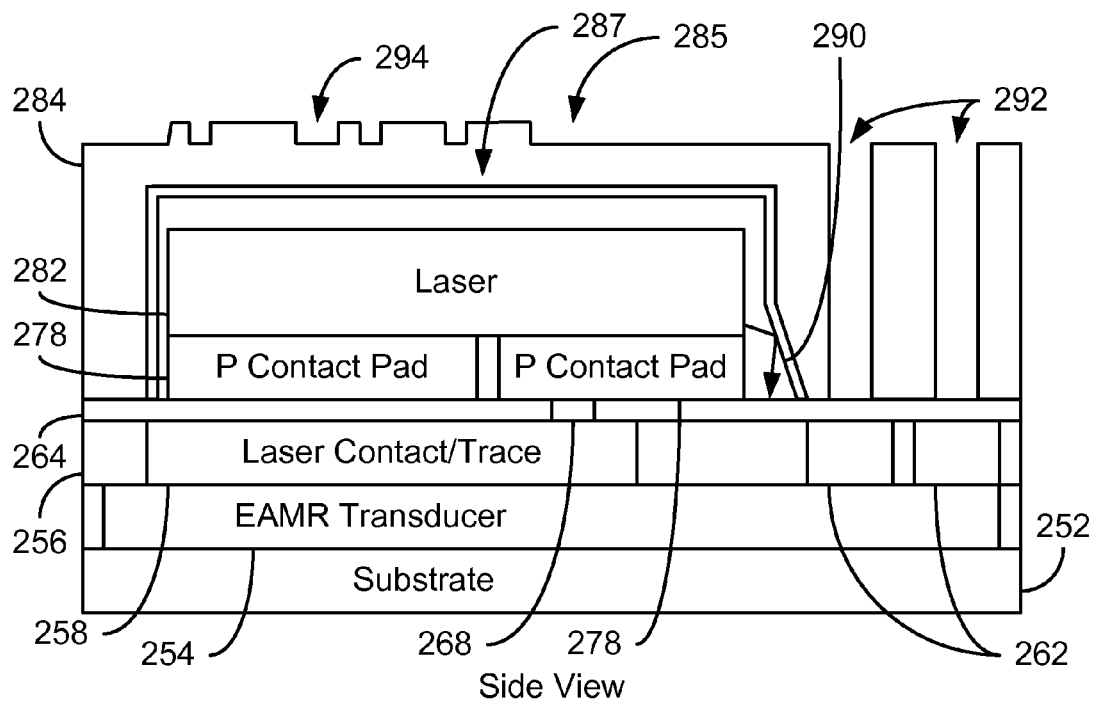

The carrier substrate is removed, via step 218. In some embodiments, step 218 includes grinding or wet etching the carrier substrate 284. In other embodiments, the capping layer 282 may be attached to the carrier substrate 284 in another manner, for example using wax or other releasable adhesive. Step 218 may then include heating the EAMR head, exposing the EAMR head to ultraviolet light, providing the appropriate release mechanism. FIG. 13 depicts the EAMR head 250 after step 218 is performed. Thus, the carrier substrate 284 has been removed. Further, because the device identification 294 was etched in the carrier substrate 286, the device identification 294 is visible on the trailing surface 285 of the capping layer 282.

Vias are plated in the via holes 292, via step 220. Step 220 may thus include plating Cu or other conductive material. Because of the electrical current path 272, connection may be made to the transducer contacts 262 during the plating. As a result, plating of the vias is facilitated. Also in step 292, bond pads may be formed on the trailing surface 285 of the capping layer 284. Formation of the bond pads may include providing a photoresist mask for the bond pads, then plating gold on the trailing surface of the capping layer 284.

A device identification 294 may be provided on the trailing surface 285 if one is not already present, via step 222. However, in other embodiments, step 22 may be performed as part of preparation of the capping layer.

Figure 14:
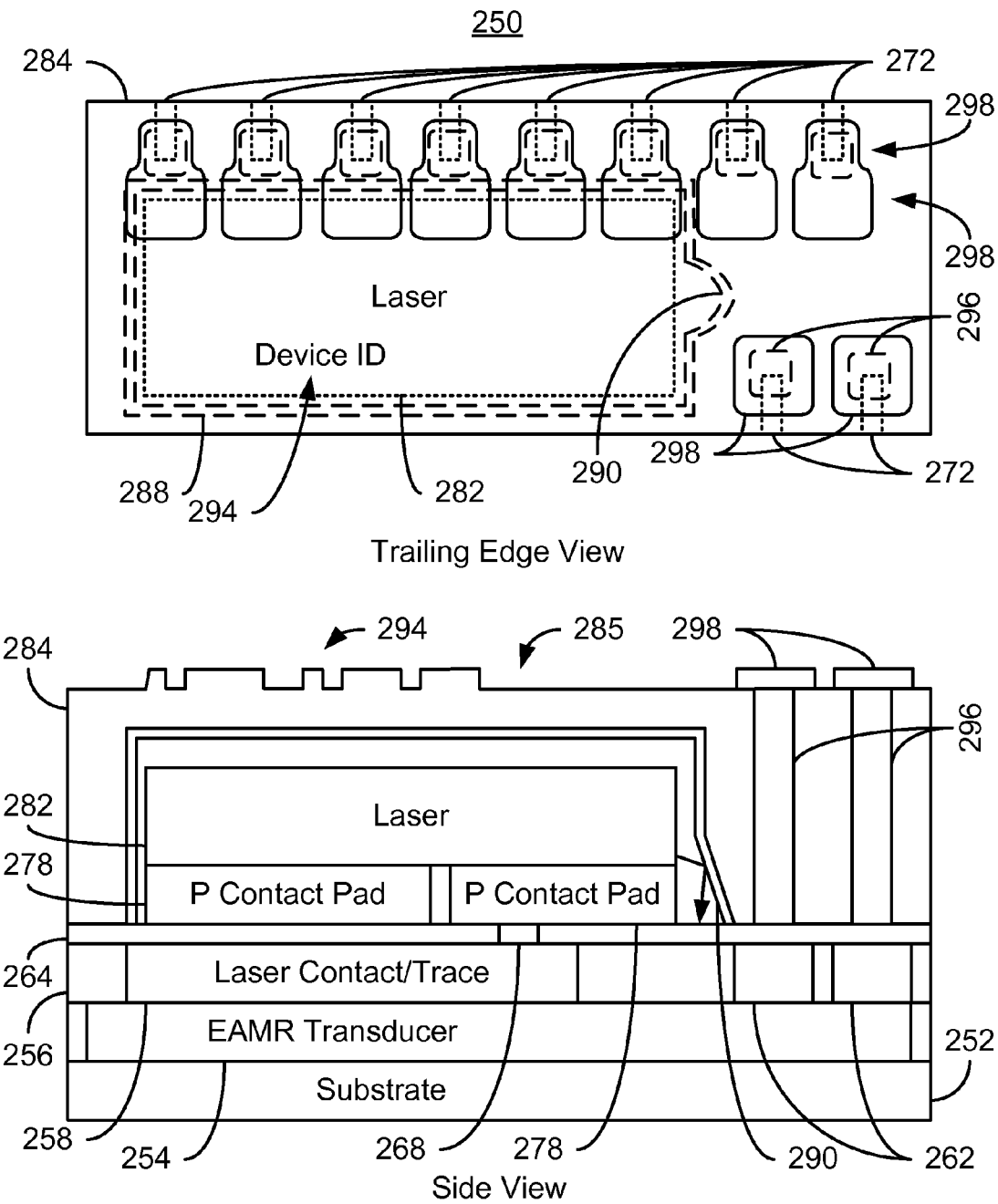

The substrate 252 is separated into individual EAMR heads 250, via step 224. For example, the substrate 252 may be diced and lapped as usual. After step 224, the electrical current path 272 is broken by the dicing process. Thus, the transducer pads 262 and laser pad 258 are not electrically coupled through the electrical current path 272. Further, the thickness of the EAMR head 250 may be further adjusted by lapping a portion of the substrate 252. FIG. 14 depicts the EAMR head 250 after step 224 is performed. For clarity, only some portions of the EAMR head 200 are depicted. Further, structures that are distant from the trailing edge are shown by dashed lines. Thus, vias 296 have been plated in via holes 292. In addition, bond pads 298 have been formed. Further, the electrical current path 272 has been broken. Fabrication may be completed, via step 226. Step 226 may include incorporating the EAMR head 250 into a drive.

Using the method 200, EAMR heads, such as the EAMR head 250 may be fabricated. The method 200 and EAMR head 250 share the benefits of the method 100 and EAMR head 150. Thus, the laser 282 may be on the trailing edge of the slider. Because the laser 282 is insulated from and at a different layer than the transducer contacts 262, a larger laser 282 may be used. For example, a five hundred micron layer 282, which occupies most of the area of the trailing edge of the EAMR head 250, may be used. Thus, power and reliability may be improved. Using the method 250, improved plating to the transducer contacts 262 may be provided. A flat surface for bonding to the pads 298, as well as larger pads, may also be provided. Thus, providing electrical connection to the EAMR head 250 may be simplified and improve yield. Moreover, the form factor of the EAMR head 250 is similar to a conventional EAMR head which may not have the enhanced performance and reliability of the EAMR transducer 250. Thus, incorporating the improved EAMR head 250 into existing drives may be accomplished without significant increases in cost and time delays. Consequently, manufacturability and performance of the EAMR heads may be improved.

I claim:

1. A method for providing a plurality of energy assisted magnetic recording (EAMR) heads including a plurality of sliders, each of the plurality of sliders having a leading edge and a trailing edge, the method comprising:
    fabricating an EAMR transducer for each of the plurality of EAMR heads on a substrate having a front face corresponding to the trailing edge of each of the plurality of sliders, the EAMR transducer being fabricated on the front face and residing at the trailing edge of the slider;
    providing an overcoat layer on the EAMR transducer, the overcoat layer including a plurality of transducer contacts and at least one laser contact, the EAMR transducer residing between the overcoat layer and the trailing edge;
    providing a laser for the EAMR transducer on each of the plurality of sliders, the laser for providing light to the EAMR transducer, the laser being electrically coupled to the at least one laser contact and electrically insulated from at least a portion of the plurality of transducer contacts, the overcoat layer residing between any portion of each of the at least one laser and the at least one EAMR transducer;
    enclosing the laser in a capping layer for each of the plurality of EMAR heads, the capping layer having a laser-facing surface including a laser cavity therein, at least one via, a trailing surface, and a plurality of EAMR pads on the trailing surface, the laser cavity enclosing the laser between the overcoat layer and the capping layer, the at least one via for providing electrical connection to the plurality of transducer contacts; and
    separating the substrate into the plurality of EAMR heads.

2. The method of claim 1 further comprising:
    providing an antireflective coating (ARC) on the overcoat layer, the ARC including a plurality of apertures therein, the plurality of apertures corresponding to the at least one laser contact and for allowing the laser to be electrically coupled to the at least one laser contact, the ARC electrically insulating the laser from at least a portion of the plurality of transducer contacts.

3. The method of claim 2 wherein providing the ARC further includes:
    providing a plurality of contacts through the plurality of apertures.

4. The method of claim 3 wherein the providing the plurality of contacts further includes:
    providing an electrical current path coupling the at least the portion of the plurality of transducer contacts, the electrical current path for use in plating the at least one via.

5. The method of claim 4 wherein the separating further includes:
    removing a portion of the electrical current path such that the at least the portion of the plurality of transducer contacts are not electrically connected through the electrical current path.

6. The method of claim 3 wherein the providing the laser further includes:
    providing a plurality of laser bond pads; and
    bonding the laser to the plurality of bond pads.

7. The method of claim 1 wherein the enclosing the at least one laser further includes:
    providing the capping layer on a carrier substrate;
    bonding the capping layer to each of the plurality of EAMR heads; and
    removing the carrier substrate.

8. The method of claim 7 wherein the capping layer is at least one of molded capping layer and a Si capping layer.

9. The method of claim 1 wherein the capping layer includes at least one via hole therein and wherein the enclosing the laser further includes:
    plating the at least one via in the at least one via hole.

10. The method of claim 1 wherein the providing the overcoat layer further includes:
    providing a heat sink for the laser on each of the plurality of EAMR heads.

11. The method of claim 1 wherein the step of providing the capping layer further includes:
    depositing a mirror onto a portion of the laser-facing surface such that the mirror is integrated into the capping layer, the mirror for directing the light toward the EAMR transducer.

12. The method of claim 1 wherein the step of providing the capping layer further includes:
    forming the laser-facing surface in a single layer.

13. A method for providing a plurality of energy assisted magnetic recording (EAMR) heads including a plurality of sliders, each of the plurality of sliders having a leading edge and a trailing edge, the method comprising:
    fabricating an EAMR transducer for each of the plurality of EAMR heads on a substrate having a front face corresponding to the trailing edge of each of the plurality of sliders, the EAMR transducer being fabricated on the front face and residing at the trailing edge of the slider;
    providing an overcoat layer on the EAMR transducer, the overcoat layer including a plurality of transducer contacts and at least one laser contact, the EAMR transducer residing between the overcoat layer and the trailing edge;

providing a laser for the EAMR transducer on each of the plurality of sliders, the laser for providing light to the EAMR transducer, the laser being electrically coupled to the at least one laser contact and electrically insulated from at least a portion of the plurality of transducer contacts;

enclosing the laser in a capping layer for each of the plurality of EMAR heads, the capping layer having a laser-facing surface including a laser cavity therein, at least one via, a trailing surface, and a plurality of EAMR pads on the trailing surface, the laser cavity enclosing the laser between the overcoat layer and the capping layer, the at least one via for providing electrical connection to the plurality of transducer contacts;

providing a device identification for each of the plurality of EAMR heads on the trailing surface of the capping layer; and separating the substrate into the plurality of EAMR heads.

14. A method for providing a plurality of energy assisted magnetic recording (EAMR) heads including a plurality of sliders, each of the plurality of sliders having a leading edge and a trailing edge, the method comprising:

fabricating a plurality of EAMR transducers for the plurality of EAMR heads on a substrate having a front face corresponding to the trailing edge, each of the plurality of EAMR transducers being fabricated on the front face and residing at the trailing edge of the slider;

providing an overcoat layer on the plurality of EAMR transducers, the overcoat layer including a plurality of transducer contacts, at least one laser contact, and a laser heat sink for each of the plurality of EAMR heads, the plurality of EAMR transducers residing between the overcoat layer and the trailing edge;

providing an antireflective coating (ARC) on the overcoat layer, the ARC including a plurality of apertures therein for allowing a plurality of lasers to be electrically coupled to the at least one laser contact, the ARC layer electrically insulating the plurality of lasers from at least a portion of the plurality of transducer contacts;

providing a plurality of contacts through the plurality of apertures to the at least one laser contact and an electrical current path coupling the at least the portion of the plurality of transducer contacts;

providing a plurality of laser bond pads on the ARC and electrically connected with the contacts;

providing a plurality of lasers bonded to the plurality of laser bond pads, the plurality of lasers for providing light to the plurality of EAMR transducers, each of the plurality of lasers being electrically coupled to the at least one laser contact and electrically insulated from at least a portion of the plurality of transducer contacts;

enclosing the plurality of lasers in a capping layer bonded to a carrier substrate, the capping layer having a laser-facing surface including a plurality of laser cavities therein, and a plurality of via holes therein, a trailing surface, the plurality of laser cavities enclosing the plurality of lasers between the overcoat layer and the molded capping layer, the plurality of via holes for allowing electrical connection to the plurality of transducer contacts;

removing the carrier substrate;

plating a plurality of vias in the via holes, the electrical current path allowing electrical connection to the at least the portion of the plurality of transducer contacts during the plating;

providing a device identification for each of the plurality of EAMR heads on the trailing surface of the capping layer; and separating the substrate into the plurality of EAMR heads, a portion of the electrical current path being removed in the separating such that the at least the portion of the plurality of transducer contacts are not electrically connected through the electrical current path.

15. An energy assisted magnetic recording (EAMR) head comprising:

a slider including a leading edge and a trailing edge;

at least one EAMR transducer residing on the trailing edge of the slider;

an overcoat layer on the EAMR transducer, the overcoat layer including a plurality of transducer contacts and at least one laser contact, the at least one EAMR transducer residing between the overcoat layer and the trailing edge;

at least one laser for providing light to the EAMR transducer, the at least one laser being electrically coupled to the at least one laser contact and electrically insulated from at least a portion of the plurality of transducer contacts, the overcoat layer residing between any portion of each of the at least one laser and the at least one EAMR transducer;

a capping layer having a laser-facing surface for enclosing the at least one laser, at least one via, a trailing surface, and a plurality of EAMR pads on the trailing surface, the at least one laser residing between the overcoat layer and the capping layer, the at least one via for providing electrical connection to the plurality of transducer contacts.

16. The EAMR head of claim 15 further comprising:

an antireflective coating (ARC) on the overcoat layer, the ARC including a plurality of apertures therein for allowing the laser to be electrically coupled to the at least one laser contact and electrically insulated from at least a portion of the plurality of transducer contacts.

17. The EAMR head of claim 16 further comprising:

a plurality of contacts residing in the plurality of apertures and connecting the laser with the at least one laser contact through the plurality of apertures.

18. The EAMR head of 17 further comprising:

a plurality of laser bond pads for electrically connecting the laser with the plurality of contacts and mechanically coupling the laser with the slider.

19. The EAMR head of claim 15 wherein the capping layer is at least one of molded capping layer and a Si capping layer.

20. The EAMR head of claim 15 wherein the overcoat layer further includes:

a heat sink for the laser.

21. The EAMR transducer of claim 15 wherein the capping layer further includes:

a mirror integrated on a portion of the laser-facing surface, the mirror for directing the light toward the EAMR transducer.

22. The EAMR transducer of claim 15 wherein the capping layer is a component having the laser-facing surface integrated therein.

23. An energy assisted magnetic recording (EAMR) head comprising:

a slider including a leading edge and a trailing edge;

at least one EAMR transducer residing on the trailing edge of the slider;

an overcoat layer on the EAMR transducer, the overcoat layer including a plurality of transducer contacts and at least one laser contact, the at least one EAMR transducer residing between the overcoat layer and the trailing edge;

at least one laser for providing light to the EAMR transducer, the at least one laser being electrically coupled to the at least one laser contact and electrically insulated from at least a portion of the plurality of transducer contacts;

a capping layer having a laser-facing surface for enclosing the at least one laser, at least one via, a trailing surface, and a plurality of EAMR pads on the trailing surface, the at least one laser residing between the overcoat layer and the capping layer, the at least one via for providing electrical connection to the plurality of transducer contacts; and a device identification on the trailing surface of the capping layer.

* * * * *